United States Patent
Cech et al.

(10) Patent No.: US 10,346,570 B2
(45) Date of Patent: Jul. 9, 2019

(54) METHOD FOR DETERMINING SYSTEM RELIABILITY OF A LOGIC CIRCUIT

(71) Applicant: Siemens AG Oesterreich, Vienna (AT)

(72) Inventors: Christian Cech, Ebreichsdorf (AT); Bernhard Fischer, Vienna (AT); Thomas Hinterstoisser, Bisamberg (AT); Martin Matschnig, Tulln (AT)

(73) Assignee: Siemens AG Österreich, Vienna (AT)

( * ) Notice: Subject to any disclaimer, the term of this patent is extended or adjusted under 35 U.S.C. 154(b) by 69 days.

(21) Appl. No.: 15/328,321

(22) PCT Filed: Jul. 22, 2015

(86) PCT No.: PCT/EP2015/066749
§ 371 (c)(1),
(2) Date: Jan. 23, 2017

(87) PCT Pub. No.: WO2016/012496
PCT Pub. Date: Jan. 28, 2016

(65) Prior Publication Data
US 2017/0206295 A1 Jul. 20, 2017

(30) Foreign Application Priority Data
Jul. 23, 2014 (DE) .................. 10 2014 214 324

(51) Int. Cl.
*G06F 9/455* (2018.01)
*G06F 17/50* (2006.01)
(Continued)

(52) U.S. Cl.
CPC ........ *G06F 17/5036* (2013.01); *G06F 11/076* (2013.01); *G06F 11/079* (2013.01);
(Continued)

(58) Field of Classification Search
USPC ................. 716/106, 108, 109, 111, 119, 136
See application file for complete search history.

(56) References Cited

U.S. PATENT DOCUMENTS

| | | | | |
|---|---|---|---|---|
| 9,910,947 B1 * | 3/2018 | Kao | .................... | G06F 17/5036 |
| 2009/0019411 A1 * | 1/2009 | Chandra | ............. | G06F 17/5009 |
| | | | | 716/119 |
| 2013/0298101 A1 * | 11/2013 | Chandra | ................. | G06F 17/50 |
| | | | | 716/136 |

OTHER PUBLICATIONS

Weiping Liao et al: "Microarchitecture level power and thermal simulation considering temperature dependent leakage model"; Proceedings of the 2003 International Symposium on Low Power Electronics and Design; ISPLED'03; Seoul Korea; New York NY:ACM US; pp. 211-216; XP010658638; ISBN: 978-1-58113-682-1.

(Continued)

*Primary Examiner* — Brian Ngo
(74) *Attorney, Agent, or Firm* — Cozen O'Connor

(57) ABSTRACT

A method for determining system reliability of a logic circuit, wherein a functional component model for design/simulation of a circuit model of the logic circuit is created, where functional components model are expanded by adding an associated power model, a temperature model, and a reliability, where the logic circuit is constructed with expanded model components and, based on simulation of the logic circuit aided by the constructed circuit model, a functional, a power-dependent, and a temperature-dependent behavior and a temperature-dependent failure rate are derived for each component in a component specific manner for a specified application case, and where in addition to the functional behavior, a power and temperature behavior and a total failure rate can be determined simply and dynami-
(Continued)

cally, based on the derived data and dependent on temperature and simulation time for the logic circuit for the specified application case.

13 Claims, 2 Drawing Sheets

(51) Int. Cl.
    *G06F 11/26*     (2006.01)
    *G06F 11/07*     (2006.01)

(52) U.S. Cl.
    CPC .......... *G06F 11/0736* (2013.01); *G06F 11/26* (2013.01); *G06F 17/5022* (2013.01); *G06F 2217/76* (2013.01); *G06F 2217/78* (2013.01); *G06F 2217/80* (2013.01)

(56) References Cited

OTHER PUBLICATIONS

Sander B. et al: "Design and Run-time Reliability at the Electronic System Level"; IPSJ Transactions on System LSI Design Methodology; Bd. 3. Nr. 3; pp: 143-163; XP055219568; DOI: 10.2197/ipsjtsidm.3.140.
Bartolini Davide B et al: "A Framework for Thermal and Performance Management"; USENIX; pp: 1-16; XP061013625.

* cited by examiner

METHOD FOR DETERMINING SYSTEM RELIABILITY OF A LOGIC CIRCUIT

CROSS-REFERENCE TO RELATED APPLICATIONS

This is a U.S. national stage of application No. PCT/EP2015/066749 filed 22 Jul. 2015. Priority is claimed on German Application No. 10 2014 214 324.1 filed 23 Jul. 2014, the content of which is incorporated herein by reference in its entirety.

1. FIELD OF THE INVENTION

The present invention generally relates to the field of electronic and logic circuits, in particular integrated circuits, such as Application-Specific Integrated Circuits (ASICs), Field-Programmable Gate Arrays (FPGAs), and System-on-Chip systems and, more particularly, to a method for determining system reliability of a logic circuit constructed out of individual components, where a functional component model for design and simulation of a circuit model of the logic circuit is created for each component.

2. DESCRIPTION OF THE RELATED ART

Presently, logic circuits (e.g., ASICs or FPGAs) are utilized in many electric and/or electronic equipment units or systems. Usually, logic circuits consist of circuit elements or blocks of circuit elements placed on a single substrate (e.g., a semiconductor substrate) and wired together, which are also referred to as system components or components. For example, an integrated circuit consists of a quantity of different components that are placed on or in a monocrystalline substrate. Integrated circuits where all or a large part of the functions are placed on one chip are also referred to as System-on-Chip. This integration results in extensive functionalities and applications being made available on a small space. By virtue of the rapid progress in technological development, it is now possible to place large complex logic circuits with a large quantity of components on one semiconductor chip. During a development process or in the course of a design, logic circuits are frequently planned with computer-aided tools. In this regard, logic circuits are represented as circuit models, for example, by which the logic circuit is described based on functions, behaviors, or algorithms. The components in the logic circuit (e.g., hardware components, system components that consist of hardware and software parts, etc.) are likewise represented via functional component models, out of which a circuit model of a logic circuit or a logic system can then be created. Based on a circuit model, in particular based on a circuit model with a high level of abstraction, it is possible to check or verify the functionality of the corresponding circuit via simulation, for example. Circuit models or functional component models of this type are also referred to as High-Level Models. By using a high-level programming language, such as C++, SystemC or System-Verilog, the functional component models and circuit models of logic circuits can then be written down, and represented, and a functional behavior of the logic circuit and also the individual components in the logic circuit simulated.

Furthermore, it is important during the development and design of a logic circuit or a logic system to take account of a system reliability and a system availability because requirements for the system reliability and system availability frequently influence the selection and/or dimensioning of components in the logic circuit. In this regard, system reliability and system availability are viewed as a certainty of functioning or availability—depending on a failure frequency and maintenance frequency—of a totality (=logic circuit) of technical elements (=components in the logic circuit) interacting with each other. The reliability and lifetime of the overall system or the overall logic circuit is strongly influenced in this regard by the respective failure or error rates of the individual components and can be evaluated by combining these factors. The failure rate of an electronic component is often stated as Failure-in-Time (FiT), where the Failure-in-Time as a unit states a quantity of failures occurring in $10^9$ hours. This means, for example, that components with a high FiT value fail more frequently in statistical terms than components with a low FiT value.

Usually, for the purpose of determining the system reliability of a logic circuit, assumptions and scenarios for the worst or most unfavorable case are chosen with reference to the components utilized in each case (e.g. high FiT value, etc.).

In this regard, for the purpose of determining the system reliability, a static system topology is frequently assumed although the system reliability is also dependent on (mostly dynamic) physical effects, such as power input of the components or temperature of the components. Dynamic effects of this type are frequently not taken into account during the determination of the system reliability. As a result, an over-dimensioning of individual components or the overall logic circuit can consequently come about so that parameters, such as specified error rates or reliability requirements, are satisfied. This results in over-dimensioned circuits or systems and higher product costs.

To date there have been, for example, approaches to determining the reliability of processors in which, for example, the temperature and reliability or error rate of a processor is determined as a function of different processor loads. Thus, for example, methods for simulating the reliability profile of processor-based System-on-Chip systems is known from the publication Lin Huang et al, "AgeSim: A Simulation Framework for Evaluating the Lifetime Reliability of Processor-Based SoCs", 2010, or from the publication Ayse K. Coskun et al., "A Simulation Methodology for Reliability Analysis in Multi-Core SoCs", 2006. Here, the respective load on the processor is recorded and used for the reliability analysis, where the energy consumption and a resultant temperature of the processor is also taken into account. With the methods disclosed in these publications, the lifetime or the aging of a processor in a System-on-Chip, or a temperature-dependent error rate of a processor, can be simulated, although the further components of the system or the logic circuit that also have an influence on the reliability of the circuit are not taken into account.

Furthermore, an analysis method for stationary and dynamic temperature analysis of a multiprocessor system, in which periodic applications are executed, is known from the publication Ivan Ukhov et al, "Steady-State Dynamic Temperature Analysis and Reliability Optimization for Embedded Multiprocessor Systems", 2012. In this method also, only processing elements or processors and their temperature-dependent behavior during the operation sequence of applications or during a runtime are looked at. Further components and their temperature-dependent behavior and also further dynamic physical effects are largely left out of account during the analysis.

An analysis and simulation method for embedded multi-core processors is likewise described in the publication: Sander, Björn et al, "Design and Run-time Reliability at the Electronic-System Level". This method can be brought in for application-specific temperature and reliability considerations, a power model and a power distribution of a model of the multicore processor system to be analyzed being taken into account. In this publication also, however, only processor units are looked at and a mutual influence of the processor units based on temperature etc. is not taken into account.

SUMMARY OF THE INVENTION

In view of the foregoing, it is therefore an object of the invention to provide a method with which the system reliability of a logic circuit with any desired system and/or hardware components and a dynamic profile of error rates can be analyzed in a simple manner.

This and other objects and advantages are achieved in accordance with the invention by a method in which, for a respective component of a logic circuit, an associated respective functional component model is expanded by adding an associated power model, a temperature model which is based on the power model, and a reliability model which is based on the temperature model. A circuit model is then constructed for the logic circuit with the aid of the expanded component models. Based on a simulation of the logic circuit for a specified application case (e.g., specific utilization of the logic circuit in, e.g., specific ambient conditions etc.), a functional, a power-dependent, and a temperature-dependent behavior, and also a temperature-dependent failure rate, is then derived for each of the components or component models used.

The main aspect of the solution provided by the method in accordance with the invention consists in the fact that at system level, during modeling of the components for a logic circuit, a functional component model is added with further models based on each other, i.e., with an associated power model, a temperature model constructed on the same, and a corresponding reliability model for the respective component. Based on these expanded component models or with the aid of a circuit model constructed out of the same, application cases for the logic circuit are then simulated and a functional, power-dependent, and temperature-dependent behavior of the respective component is derived from the application cases. Furthermore, a temperature-dependent failure rate of the respective component and, therefore, a reliability and lifetime of the respective component for the respective application case, can be determined dynamically. These dynamically determined component-specific failure rates can then ideally be brought in for an optimal layout of the logic circuit. This prevents components, in particular hardware components and/or individual electronic devices, from being over-dimensioned. A logic circuit can therefore be created at lower costs.

Ideally, based on the component-specific temperature-dependent failure rates for the specified application case, a model for a total failure rate of the logic circuit can be determined as a function of the temperature. Through the combination of the temperature-dependent failure rates determined on a component-specific basis (e.g., as the sum of the failure rates, etc.), an overall reliability or an overall reliability function of the logic circuit for the specified application case can be determined in a simple manner. With the aid of the model for the overall failure rate of the logic circuit, the temperature-dependent failure behavior of the logic circuit can be estimated and the same then dimensioned optimally, e.g., with reference to reliability requirements. With the method in accordance with the invention, for example, a current failure rate of the respective components and the overall logic circuit is available at every time point in the simulation of the respective application case, which current failure rate is stated, e.g., as a Failure-in-Time or FiT rate and therefore provides information about the system reliability and a lifetime of the logic circuit for a specific application case. Therefore, via the method in accordance with the invention, certification measures can also be supported, for example, in which, e.g., a specific FiT rate is demanded for a specific application case or operating case.

Furthermore, in an advantageous manner for the specified application case, a power behavior and/or temperature behavior of the logic circuit can be determined based on the power-dependent and/or temperature-dependent behavior of the respective components. In this way, for example, a power input etc. and/or a temperature development, based on the power input, a mode of functioning based on the temperature development etc. of individual components can be investigated and analyzed in a very simple manner. There is also the option, however, of deriving a power behavior and/or temperature behavior of the overall logic circuit from the component-specific behavior based on the simulation for the respective application case. These analysis results can likewise be used for an optimization of the logic circuit.

It is advantageous if ambient conditions are also taken into account alongside the component-specific temperature behavior for the derivation of the component-specific temperature-dependent failure rate of the respective component. Therefore, for example, a typical temperature for the utilization of the logic circuit can ideally also be taken into account. Furthermore, a temperature-dependent interaction between the components in the circuit (e.g., based on the design, etc.) is also taken into account in this regard. An effect of a cooling mechanism utilized for the logic circuit can also be taken into account in this regard. There is therefore the option, for example, of already optimizing a cooling of the logic circuit and/or the design (e.g., prevention of strong mutual temperature-dependent interaction between individual components, etc.) of the logic circuit at an early phase of the development for the respective application case, and therefore where relevant of increasing the lifetime of the logic circuit.

Furthermore, it is beneficial if a simulation time for the respective application case is taken into account during the derivation of the component-specific temperature-dependent failure rates and also during the determination of the total failure rate for the logic circuit. The component-specific failure rates and also the total failure rate of the logic circuit can therefore be viewed as a function dependent on time and also on temperature. Aging processes can therefore be simulated in a very simple manner, for example. Furthermore a current failure rate is therefore available (in a component-specific and circuit-specific manner) for every simulation time point (e.g., as a FiT rate). Therefore, a reliability of the components and also a system reliability of the logic circuit can be estimated dynamically for the respective application very well, and the circuit adapted to the corresponding requirements for reliability and lifetime in a very simple manner.

In an advantageous manner, the circuit model of the logic circuit is implemented as a High-Level Model, in particular as an Electronic-System Level model. In the course of various steps in a design process for a logic circuit, in particular for ASICs, different circuit models are created with different levels of abstraction. Different functionalities of the logic circuit can also be tested with the aid of these circuit models. At the start of a design process, a High-Level Model or in particular an Electronic-System Level or ESL model of the logic circuit is designed. Functionalities, algorithms, etc. of the individual components and also of the logic circuit can be modeled, or functional models of the components and circuit can be created, in a simple manner with the aid of this model. Furthermore, with the aid of the High-Level Model or the ESL model, the functionalities etc. of the components 017 15/321,317 Dec. 22, 2016 iout of them can be simulated and tested simply and rapidly. The corresponding expansions for power, temperature, and reliability can be added very simply in the case of the individual functional component models.

In an embodiment of the invention, an integrated circuit, in particular an Application-Specific Integrated Circuit (ASIC) or a System-on-Chip, is envisioned as the logic circuit. An integrated circuit is an electronic/logic circuit placed on a semiconductor substrate. An integrated circuit can consist of a combination of a plurality of electrically connected electronic components (mostly semiconductor circuit elements (e.g., diodes or transistors)) and/or further active and also passive circuit elements (e.g., resistors, etc.). Integrated circuits find application, for example, in the construction of processors, controllers or data memories.

A special form of integrated circuit comprises the Application-Specific Integrated Circuits (ASICs), which are utilized in many different electronic equipment units nowadays. In the case of an ASIC, the functionality of the logic circuit is already defined unambiguously during development and production, and is no longer capable of being changed subsequently. This means that an ASIC has a strict dependence on the data to be processed, and the logic implemented in an ASIC bears a close relationship to the function(s) to be implemented. Consequently, it is particularly important in the case of ASICs that system reliability is determined and testing performed to determine whether demanded or desired reliability requirements are met, for example, as early as the design or development phase and in a simple and low-cost manner.

A further form of an integrated circuit comprises a System-on-Chip or single-chip system. This is understood to mean an integration of all or a large part of the functions of a system (e.g. embedded computer, etc.). Here, a system is regarded as a combination of different components, such as logic circuits, timing, microtechnical sensors, memory units, processors or interfaces, bus system, by which, acting together, a specific functionality is provided. It is also important in the case of systems of this type to be able to test, in a simple and low-cost manner, as early as a design or development phase, whether demanded or desired reliability requirements can be met. The disclosed embodiments of the method allow the System-on-Chip to be tested as to its system reliability as a function of temperature and time, and where relevant optimized and/or adapted correspondingly to requirements as early as during the development process.

But it is also beneficial if a Field-Programmable Gate Array (FPGA) is envisioned as the logic circuit. By way of Field-Programmable Gate Arrays or FPGAs of this type, various circuits (from simple circuits, such as a counter circuit, up to highly complex circuits, such as a microprocessor) can be realized via a specific configuration of internal structures (e.g., gates or logic blocks). FPGAs are utilized in all areas of digital technology, in particular in areas where rapid signal processing and flexible alteration of the circuit matter are involved. Compared to other logic circuits, i.e., ASICs, FPGAs have the advantage of low development costs and very short implementation times. A particular advantage of FPGAs is that they can be reconfigured and therefore a logic circuit realized with an FPGA can be corrected and—if necessary—expanded, in a simple manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is explained in an exemplary manner on the basis of the enclosed figures, in which.

DETAILED DESCRIPTION OF THE EXEMPLARY EMBODIMENTS

Figure 1:
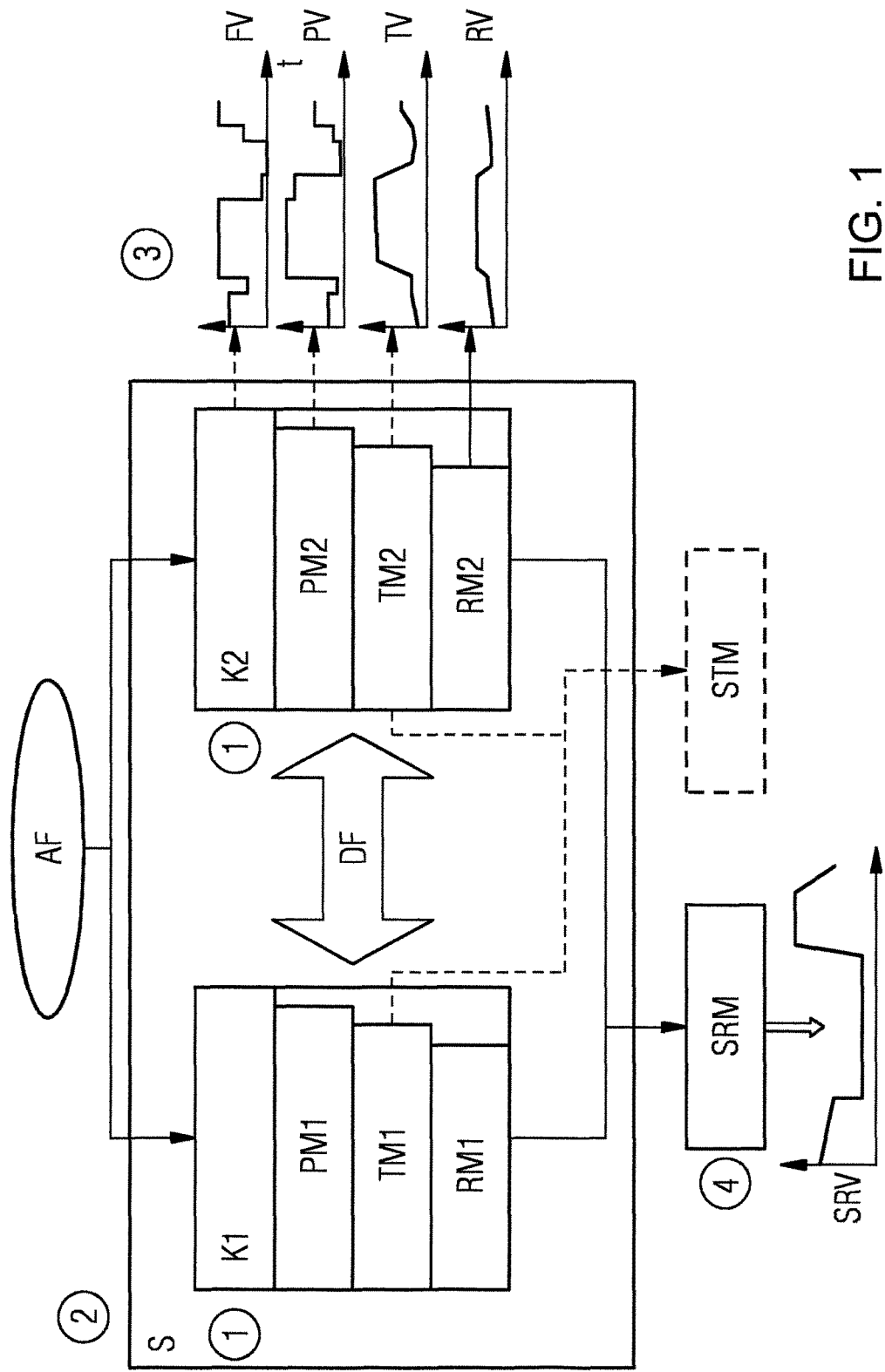
FIG. 1 shows, represented schematically, an exemplary operation sequence of the method for determining a system reliability of a logic circuit in accordance with the invention.

FIG. 1 shows in a schematic manner an exemplary operation sequence of the inventive method for determining the system reliability of a logic circuit S. Here, FIG. 1 represents a logic circuit S, such as a System-on-Chip or ASIC, or a circuit model of the logic circuit, which by way of example is described via a high-level programming language, such as SystemC, at system level in a design or development phase as a High-Level Model (e.g., ESL model).

In this regard, the exemplary logic circuit S has two exemplary components K1, K2. These components K1, K2 can be, for example, hardware components (e.g. electronic circuit elements, etc.) or system components (e.g. logic circuits, components with hardware and software parts, etc.). For the design or the development and also for a simulation of the circuit model of the logic circuit S, such as to test the functionality etc. of the logic circuit S in the case of a specified application case, a functional component model is created (likewise as a High-Level Model in a programming language such as SystemC) for each component K1, K2. With the aid of the functional component models, a functional behavior FV of the respective component K1, K2 of the logic circuit can be simulated.

In a first method step 1, the respective component models of the components K1, K2 are then expanded. Here, the component model of a first component K1 is firstly added to by including an associated first power model PM1. Empirical and/or analytical power data of the first component K1, such as power input or power consumption, in different conditions (e.g., operation or waiting status) is brought in by this first power model PM1 for a power analysis of the first component K1, for example. Building on the first power model PM1 of the first component K1, the component model of the first component K1 is added to by including a first temperature model TM1. Data from the first power model PM1 is used as input by the first temperature model TM1 and additionally added to by including, e.g., component-specific properties and data for the first component K1 (e.g., physical properties, etc.) by which a temperature behavior TV of the first component K1 is influenced. Furthermore, ambient conditions, such as an interaction with a second component K2 in the logic circuit S or an ambient temperature of an application area of the logic circuit S, for example, can also be taken into account by the first temperature model TM1. The component model of the first component K1 is then expanded by adding a first reliability model RM1 that is based on the first temperature model TM1. Information from the first temperature model TM1 and also component-specific parameters (e.g., data from manufacturers' data sheets or known interrelationships of temperature and error rate) for the first component is used by the first reliability model RM1.

In a similar manner to the component model for the first component K1, the component model of the exemplary second component K2 is also expanded in the first method step 1 by adding an associated second power model PM2, a second temperature model TM2 that is based on the second power model PM2, and a second reliability model RM2 that is based on the second temperature model TM2. Here, for example, ambient conditions (e.g., interactions with further components K1 or ambient temperature during operation of the logic circuit S) can likewise be taken into account in the case of the second temperature model TM2 alongside data from the second power model PM2 and physical properties of the second component K2. For the second reliability model RM2, component-specific properties and data from the second component K2 can likewise be brought in alongside information from the second temperature model TM2.

In a second method step 2, the circuit model of the logic circuit S is then described or constructed at system level, e.g., with the aid of SystemC, out of the expanded component models of the components K1, K2. The circuit model then represents a basis for simulation of the logic circuit S or its behavior and also the behavior of the individual components K1, K2 for specified application cases AF.

In a third method step 3, for example, application cases AF intended for the simulation are then specified and run through with the circuit model of the logic circuit S. Here, a functional behavior FV, a power-dependent behavior PV, and a temperature-dependent behavior TV are then derived in a component-specific manner for the respective component K1, K2 for the respective specified application case AF. For the purposes of simplicity, this is only represented for the second component K2 in FIG. 1 but a functional, power-dependent, and temperature-dependent behavior as a profile over time of function, power or power input, and temperature is derived in exactly the same way for the first component K1.

Furthermore, a failure rate RV or a profile over time of the failure rate RV is derived for the respective component K1, K2 as a function of the temperature-dependent behavior of the respective component K1, K2 for the specified application case AF (once again only represented for the second component K2 in FIG. 1 for purposes of simplicity). The temperature-dependent failure rate RV or the profile over time of the failure rate RV can be stated, for example, as a Failure-in-Time or FiT rate, i.e., there is a value for the failure rate or a reliability value for every simulation time point and for every component K1, K2. Dynamic factors, such as changes in power input or temperature, of the respective component K1, K2, for example, are taken into account by the derived temperature-dependent failure rate RV of the respective component K1, K2. Furthermore, during the derivation of the power-dependent and temperature-dependent profile PV, TV and in the case of the profile of the failure rate RV for a component K1, K2, it is also possible to take into account interactions, e.g., via a data exchange DF of current information based on the simulation between the respective power, temperature, and reliability models PM1, PM2, TM1, TM2, RM1, RM2 of the components K1, K2 in the logic circuit S.

In a fourth method step 4, a model for the total failure rate SRM of the logic circuit S can then be determined based on the component-specific reliability models RM1, RM2 and the component-specific temperature-dependent failure rates RV for the respective application case AF. To do this, for example, the failure rates RV or the time profiles of the failure rates RV for the components K1, K2 in the logic circuit S can be combined and an overall reliability SRV or a time profile of an overall reliability SRV for the logic circuit S estimated or derived. A current system reliability for the logic circuit S for one or a plurality of special application cases AF can therefore be determined and is available for every simulation time point, for example. From the overall reliability SRV, for example, it is possible to derive an overall FiT rate for the logic circuit S. This overall FiT rate is given by a time-normalized integral of the overall reliability SRV, for example.

With the aid of the disclosed embodiments of the method in accordance with the invention, the system reliability of a logic circuit S and also the reliability of the components K1, K2 utilized in the logic circuit S can therefore be determined in a simple manner for specifiable application cases AF and therefore the logic circuit S can be dimensioned and designed in line with the respective use and the respective reliability requirements.

Figure 2:
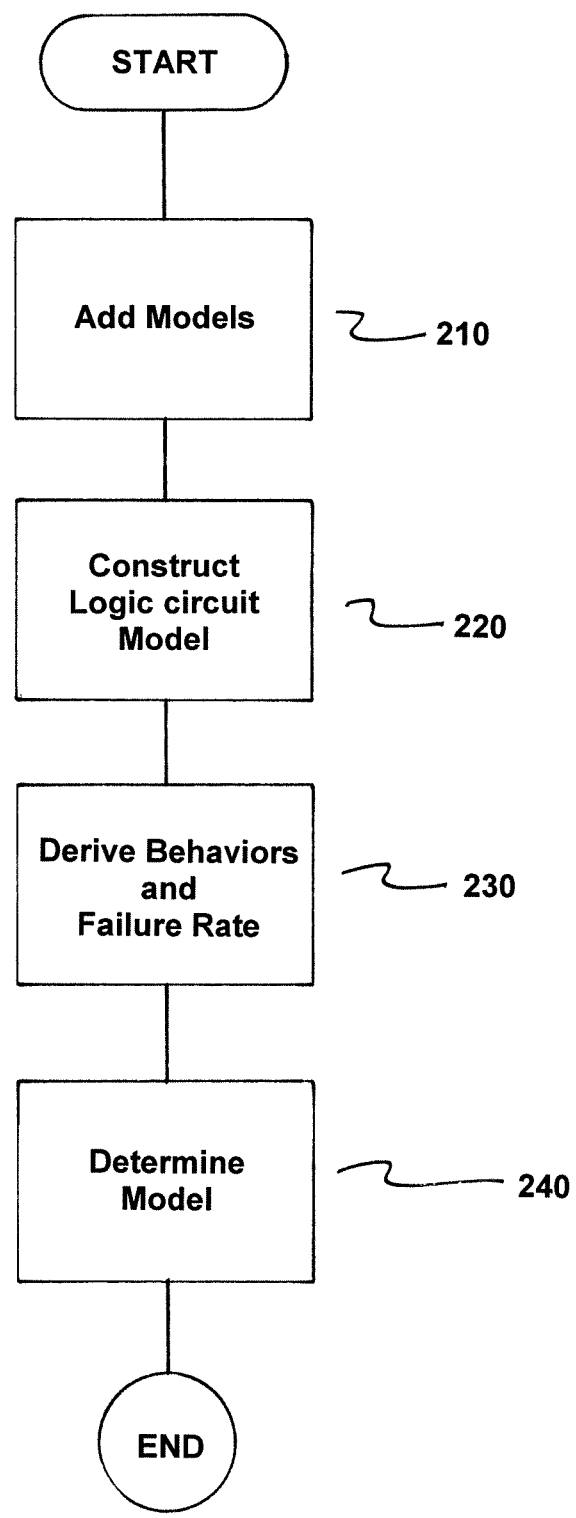
FIG. 2 is a flowchart of the method in accordance with the invention.

FIG. 2 is a flowchart of a method for determining a system reliability of a logic circuit (S) which is constructed out of individual components, where a functional component model for design and simulation of a circuit model of the logic circuit (S) being created for each component (K1, K2). The method comprises adding (1) an associated power model (PM1, PM2), a temperature model (TM1, TM2) based on the power model (PM1, PM2) and a reliability model (RM1, RM2) based on the temperature model (TM1, TM2) for a respective component (K1, K2) to expand the respective functional component model, as indicated in step 210. Next, the circuit model of the logic circuit (S) is constructed (2) via expanded component models, as indicated in step 220. Next, based on a simulation of the logic circuit (S) aided by the circuit model, a functional, a power-dependent, a temperature-dependent behavior (FV, PV, TV) and a temperature-dependent failure rate (RV) for the respective component (K1, K2) in a component-specific manner are now derived (3) for a specified application case (AF), as indicated in step 230. In further step, a model representing a total failure rate (SRM) of the logic circuit (S) is determined (4) based on the component-specific temperature-dependent failure rate (RV) for the specified application case (AF), as indicated in step 240.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining a system reliability of a logic circuit which is constructed out of a processor unit and individual components, a functional component model for design and simulation of a circuit model of the logic circuit being created for each component, the method comprising:
    adding an associated power model, a temperature model based on the power model and a reliability model based on the temperature model for a respective individual component to expand the respective functional component model;
    constructing the circuit model of the logic circuit via expanded component models;
    deriving, based on a simulation of the logic circuit aided by the circuit model, a functional, a power-dependent, a temperature-dependent behavior and a temperature-dependent failure rate for the respective individual component in a component-specific manner for a specified application case; and
    creating and operating the logic circuit based on the derived functional, power-dependent, temperature-dependent behavior and the temperature-dependent failure rate for the respective individual component in a component-specific manner for the specified application case.

2. The method as claimed in claim 1, further comprising:
    determining a model representing a total failure rate of the logic circuit based on the component-specific temperature-dependent failure rate for the specified application case.

3. The method as claimed in claim 1, further comprising:
    determining at least one of (i) a power behavior and (ii) a temperature behavior of the logic circuit is furthermore determined from at least one of (i) the power-dependent and (ii) temperature-dependent behavior of the respective individual components for the specified application case.

4. The method as claimed in claim 2, further comprising:
    determining at least one of (i) a power behavior and (ii) a temperature behavior of the logic circuit is furthermore determined from at least one of (i) the power-dependent and (ii) temperature-dependent behavior of the respective individual components for the specified application case.

5. The method as claimed in claim 1, wherein ambient conditions are also taken into account alongside the component-specific temperature behavior to derive the component-specific temperature-dependent failure rate of the respective individual component.

6. The method as claimed in claim 2, wherein ambient conditions are also taken into account alongside the component-specific temperature behavior to derive the component-specific temperature-dependent failure rate of the respective individual component.

7. The method as claimed in claim 3, wherein ambient conditions are also taken into account alongside the component-specific temperature behavior to derive the component-specific temperature-dependent failure rate of the respective individual component.

8. The method as claimed in claim 1, wherein a simulation time for the respective specified application case is taken into account during derivation of the component-specific temperature-dependent failure rates and also during determination of the total failure rate for the logic circuit.

9. The method as claimed in claim 1, wherein the circuit model of the logic circuit is implemented as a High-Level Model.

10. The method as claimed in claim 1, wherein the logic circuit comprises an integrated circuit.

11. The method as claimed in claim 1, wherein the logic circuit comprises one of a field-programmable logic gate arrangement and a Field-Programmable Gate Array.

12. The method as claimed in claim 9, wherein the High-Level Model comprises an Electronic-System Level model.

13. The method as claimed in claim 10, wherein the integrated circuit comprises one of an Application-Specific Integrated Circuit and a System-on-Chip.

* * * * *